United States Patent
Shionoiri et al.

(10) Patent No.: US 8,811,901 B2
(45) Date of Patent: Aug. 19, 2014

(54) WIRELESS POWER FEEDING SYSTEM AND WIRELESS POWER FEEDING METHOD

(75) Inventors: Yutaka Shionoiri, Kanagawa (JP); Koichiro Kamata, Kanagawa (JP); Misako Sato, Kanagawa (JP); Shuhei Maeda, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 179 days.

(21) Appl. No.: 13/189,862

(22) Filed: Jul. 25, 2011

(65) Prior Publication Data
US 2012/0025631 A1   Feb. 2, 2012

(30) Foreign Application Priority Data
Jul. 30, 2010  (JP) ................... 2010-171575

(51) Int. Cl.
*H04B 7/00* (2006.01)
*H04B 1/00* (2006.01)

(52) U.S. Cl.
USPC .......................... 455/41.2; 455/573

(58) Field of Classification Search
USPC .................. 455/41.1, 41.2, 572, 573
See application file for complete search history.

(56) References Cited

U.S. PATENT DOCUMENTS

| | | | |
|---|---|---|---|
| 5,124,699 A | 6/1992 | Tervoert et al. | |
| 5,428,521 A | 6/1995 | Kigawa et al. | |
| 5,790,946 A | 8/1998 | Rotzoll | |
| 6,509,217 B1 | 1/2003 | Reddy | |
| 6,737,302 B2 | 5/2004 | Arao | |
| 6,837,438 B1 | 1/2005 | Takasugi et al. | |
| 7,180,421 B2 | 2/2007 | Pahlaven et al. | |
| 7,209,771 B2 | 4/2007 | Twitchell, Jr. | |
| 7,301,830 B2 | 11/2007 | Takahashi et al. | |
| 7,394,382 B2 | 7/2008 | Nitzan et al. | |
| 2002/0049714 A1 | 4/2002 | Yamazaki et al. | |

(Continued)

FOREIGN PATENT DOCUMENTS

| | | |
|---|---|---|
| JP | 2010-119246 | 5/2010 |
| WO | WO 2010-055381 A1 | 5/2010 |

OTHER PUBLICATIONS

Kurs et al., "Wireless Power Transfer via Strongly Coupled Magnetic Resonances,", Science, Jul. 6, 2007, vol. 317, No. 5834, pp. 83-86.

*Primary Examiner* — Ping Hsieh
*Assistant Examiner* — Xin Jia
(74) *Attorney, Agent, or Firm* — Nixon Peabody, LLP; Jeffrey L. Costellia

(57) ABSTRACT

An object is to provide a power feeding system and a power feeding method which are more convenient for a power feeding user at the power receiving end, without causing increases in complexity and size of devices. An object is to provide a power feeding system and a power feeding method which also allow a power feeding provider (a company) which feeds power (at the power transmitting end) to supply power without waste. A power feeding device which wirelessly supplies power to a power receiver detects the position and the resonant frequency of the power receiver by receiving a position and resonant frequency detection signal using a plurality of sub-carriers having different frequencies from the power receiver, and controls the frequency of a power signal to be transmitted to the power receiver on the basis of the information. An efficient power feeding service can be offered by transmitting a power signal to the power receiver at an optimum frequency for high power transmission efficiency.

11 Claims, 10 Drawing Sheets

(56) References Cited

U.S. PATENT DOCUMENTS

| | | |
|---|---|---|
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2009/0191910 A1* | 7/2009 | Athalye et al. ............... 455/522 |
| 2010/0026236 A1* | 2/2010 | Kamiyama et al. ............ 320/108 |
| 2010/0036773 A1* | 2/2010 | Bennett ........................... 705/67 |
| 2010/0289449 A1 | 11/2010 | Elo |
| 2011/0080053 A1 | 4/2011 | Urano |
| 2011/0095619 A1 | 4/2011 | Urano |
| 2011/0101791 A1 | 5/2011 | Urano |
| 2012/0025611 A1 | 2/2012 | Kamata et al. |
| 2012/0062039 A1 | 3/2012 | Kamata et al. |

* cited by examiner

WIRELESS POWER FEEDING SYSTEM AND WIRELESS POWER FEEDING METHOD

BACKGROUND OF THE INVENTION

1. Field of the Invention

The present invention relates to a wireless power feeding system and a wireless power feeding method.

2. Description of the Related Art

In recent years, electronic devices using electric power as a driving power, as typified by mobile devices such as mobile phones or notebook personal computers, are often used while being carried.

In addition, transportation means such as bicycles and automobiles which use electric power as a driving power have been developed in terms of its cleanness and safety in the aspect of environment.

It is difficult to supply power to such electronic devices and transportation means, which are used outdoors or while in motion, constantly from a commercial power supply distributed to each house, through wires. Therefore, portable electronic devices and transportation means incorporate batteries which are charged from a commercial power supply in advance and operate by being supplied with power from the batteries.

Thus, the operating time of electronic devices is limited by the amount of power stored in the battery, and a user needs to prepare a spare battery or to find a commercial power supply, from which the battery can be recharged, outside the house, in order to use the electronic device continuously for a long time.

Therefore, a contactless power feeding system has been proposed and a more efficient power feeding system in view of a problem with an obstacle and the like has been studied so that the battery can be fed with power even if there is no commercial power supply (see, e.g., Patent Document 1).

REFERENCE

[Patent Document 1] Japanese Published Patent Application No. 2010-119246

SUMMARY OF THE INVENTION

However, a contactless power feeding system has a problem in that it has difficulty specifying or managing a power feeding user who receives power (at the power receiving end), controlling the amount of power supplied to a power receiver, and the like because it is a contactless system.

The addition of circuits having various functions in order to solve the above problem may lead to increases in complexity and size of devices in a power feeding system and may also result in an increase in manufacturing cost.

Therefore, it is an object to provide a power feeding system and a power feeding method which are more convenient for a power feeding user at the power receiving end, without causing increases in complexity and size of devices.

It is an object to provide a power feeding system and a power feeding method which also allow a power feeding provider (a company) which feeds power (at the power transmitting end) to supply power to a power receiver without waste.

It is an object to provide a power feeding system and a power feeding method which can offer a power feeding service efficient to both a user and a provider by specifying and managing a power feeding user at the power receiving end and properly controlling the amount of power supplied to a power receiver.

In wireless power feeding performed by a power feeding device and a power receiver, the power receiver transmits a position and resonant frequency detection signal using a plurality of signals having different frequencies to the power feeding device, and the power feeding device detects a resonant frequency which is specific to the power receiver, on the basis of the position and resonant frequency detection signal received and controls the frequency of a power signal to be transmitted (also referred to as a power signal for power transmission) to the power receiver on the basis of the information.

The power feeding device can also identify and manage a power receiver by receiving identification information of the power receiver.

A means of wireless power feeding disclosed in this specification will be briefly described below. One example of wireless power feeding is a power feeding method using an antenna. With a certain antenna shape, the efficiency of transmission of power fed from a power feeding device to a power receiver depends on the frequency of a power signal to be transmitted, the distance between the power feeding device and the power receiver, the resonant frequency specific to the power receiver, or the like.

Note that in this specification, a distance between a power feeding device and a power receiver is the shortest distance between an antenna provided in the power feeding device and an antenna of the power receiver.

If the frequency of a power signal to be transmitted is fixed to a given value $f_0$, the efficiency of transmission of power fed from the power feeding device to the power receiver reaches the maximum value when the distance between the power feeding device and the power receiver is $d_{MAX(0)}$.

The distance $d_{MAX}$ with which the efficiency of transmission of power fed from the power feeding device to the power receiver reaches the maximum value varies with the frequency f of the power signal to be transmitted and is specific to the frequency f of each power signal.

Thus, if the distance between the power feeding device and the power receiver is fixed to a given value $d_0$, it is possible to determine the frequency $f_{MAX(0)}$ of a power signal to be transmitted, at which the efficiency of transmission of power fed from the power feeding device to the power receiver reaches the maximum value.

In this specification, a resonant frequency is defined as $f_{MAX(a)}$ at which power transmission efficiency reaches the maximum value, with a distance $d_a$ between the power feeding device and the power receiver.

In a wireless power feeding method disclosed in this specification, a power receiver transmits a plurality of signals having different frequencies to a power feeding device.

In this specification, a signal having a reference frequency is defined as a base carrier $f_b$, and a signal $f_s$ which is generated by a divider circuit and a switch on the basis of the base carrier $f_b$ and has a frequency with a lower intensity than that of the base carrier (for example, $f_b-(f_b/16)$, $f_b-(f_b/32)$, or the like) is defined as a sub-carrier $f_s$.

In order to generate a plurality of signals having different frequencies by adjusting the base carrier itself to a base carrier having a different frequency, a circuit for adjusting a frequency by adjusting a voltage, such as a power supply circuit, is needed. The addition of such a circuit may lead to increases in complexity and size of devices in a power feeding system and may also result in an increase in manufacturing cost.

In a wireless power feeding method disclosed in this specification, as a plurality of signals having different frequencies which is to be transmitted from a power receiver, a plurality of sub-carriers $f_s$ generated on the basis of a base carrier $f_b$ is used. The sub-carriers $f_s$ can be adjusted relative to the base carrier $f_b$ by a switch provided between a mixer and a divider circuit.

By providing a switch between a mixer and a divider circuit to effectively use a plurality of different sub-carriers, there is no need to additionally provide a circuit for adjusting a frequency by adjusting a voltage, such as a power supply circuit, and it is therefore possible to suppress increases in complexity and size of devices and an accompanying increase in manufacturing cost.

The power feeding device receives the plurality of signals having different frequencies which are transmitted from the power receiver. Then, the power feeding device detects the intensities of the plurality of received signals having different frequencies and determines a frequency of a high intensity signal.

Here, a frequency of a high intensity signal can be referred to as a frequency corresponding to a signal of large voltage amplitude. In other words, a frequency of the highest intensity signal can be referred to as a frequency corresponding to a signal of the largest voltage amplitude, and the frequency of the highest intensity signal is a resonant frequency.

Note that the power feeding device determines the intensities of the plurality of received signals having different frequencies and, in addition, can find out the position of the power receiver from the frequencies and intensities. The position of the power receiver can also be referred to as the distance between the power feeding device and the power receiver.

After finding out the resonant frequency, the power feeding device transmits a power signal at that resonant frequency to the power receiver.

Thus, the power feeding device can supply power to the power receiver without waste by transmitting a power signal to the power receiver at an optimum frequency for high power transmission efficiency.

A configuration for wireless power feeding disclosed in this specification will be briefly described below. The power receiver and the power feeding device each have a transmission/reception circuit portion which transmits and receives electromagnetic waves to and from the other and a signal processing circuit portion which processes electrical signals of the electromagnetic waves to be transmitted and received. The signal processing circuit portion of the power receiver has a power reception control function to control power to be received from the power feeding device. The signal processing circuit portion of the power feeding device has a position and resonant frequency detection function to find out the distance between the power feeding device and the power receiver and the resonant frequency, and a power transmission control function to control power to be transmitted to the power receiver.

The power receiver includes a power receiving device portion and a power load portion and can operate the power load portion using power stored in a power storage portion of the power receiving device portion. In this specification, a power receiver means an object which operates using received power as driving power, and examples of the power receiver include portable electronic devices such as mobile phones, transportation means driven by an electric motor (automobiles, motorized bicycles, aircrafts, ships, and railroad cars), and the like.

One embodiment of a power feeding system disclosed in this specification includes a power feeding device and a power receiver including a power receiving device portion. The power feeding device includes a transmission/reception circuit portion which transmits and receives an electromagnetic wave, a signal processing circuit portion which processes an electrical signal of the electromagnetic wave to be transmitted and received by the transmission/reception circuit portion, and a power supply portion which supplies power to be transmitted to the power receiver. The signal processing circuit portion of the power feeding device has a position and resonant frequency detection function to detect the position and the resonant frequency of the power receiver, and a power transmission control function to control power to be transmitted to the power receiver. The power receiving device portion of the power receiver includes a transmission/reception circuit portion which transmits and receives an electromagnetic wave, a signal processing circuit portion which processes an electrical signal of the electromagnetic wave to be transmitted and received by the transmission/reception circuit portion, and a power storage portion including a secondary battery which stores power transmitted from the power feeding device and supplies power to be consumed by a power load portion. The transmission/reception circuit portion of the power receiving device portion includes an antenna circuit, a rectifier circuit, a mixer, a demodulation circuit, an oscillator circuit, a divider circuit, and a switch. The switch is provided between the mixer and the divider circuit. The signal processing circuit portion of the power receiving device portion has a power reception control function to control power to be received from the power feeding device.

Another embodiment of a power feeding system disclosed in this specification includes a power feeding device and a power receiver including a power receiving device portion. The power feeding device includes a transmission/reception circuit portion which transmits and receives an electromagnetic wave, a signal processing circuit portion which processes an electrical signal of the electromagnetic wave to be transmitted and received by the transmission/reception circuit portion, and a power supply portion which supplies power to be transmitted to the power receiver. The signal processing circuit portion of the power feeding device has a position and resonant frequency detection function to detect the position and the resonant frequency of the power receiver, and a power transmission control function to control power to be transmitted to the power receiver. The power receiving device portion of the power receiver includes a transmission/reception circuit portion which transmits and receives an electromagnetic wave, a signal processing circuit portion which processes an electrical signal of the electromagnetic wave to be transmitted and received by the transmission/reception circuit portion, a power storage portion including a secondary battery which stores power transmitted from the power feeding device and supplies power to be consumed by a power load portion, and a detection portion which detects the voltage, the current, or the voltage and current outputted from the secondary battery. The transmission/reception circuit portion of the power receiving device portion includes an antenna circuit, a rectifier circuit, a mixer, a demodulation circuit, an oscillator circuit, a divider circuit, and a switch. The switch is provided between the mixer and the divider circuit. The signal processing circuit portion of the power receiving device portion has a power reception control function to control power to be received from the power feeding device.

In each of the above embodiments, the transmission/reception circuit portion of the power receiving device portion can include an antenna circuit, a rectifier circuit, a modulation circuit, a demodulation circuit, an oscillator circuit, and a power supply circuit.

In each of the above embodiments, the power receiver may include a memory portion which stores identification information to be read by the signal processing circuit portion of the power receiving device portion, and the signal processing circuit portion of the power feeding device may have an identification function to identify the identification information.

One embodiment of a power feeding method disclosed in this specification includes a first step of transmitting a position and resonant frequency detection signal using a plurality of sub-carriers having different frequencies from a power receiver to a power feeding device, and detecting the position and the resonant frequency of the power receiver by the power feeding device, a second step of adjusting the frequency of a power signal to be transmitted from the power feeding device on the basis of the position and the resonant frequency of the power receiver and transmitting power from the power feeding device to the power receiver, and a third step of storing the power transmitted from the power feeding device in a secondary battery of a power storage portion of the power receiver.

The power receiver can transmit a plurality of signals having different frequencies as a position and resonant frequency detection signal, and the power feeding device can detect the position and the resonant frequency of the power receiver by receiving the plurality of signals having different frequencies and detecting the intensities of the plurality of signals having different frequencies.

The power receiver may detect the voltage, the current, or the voltage and current outputted from the secondary battery and transmit a power feeding request signal or a power reception end signal to the power feeding device according to the detection information.

In the above embodiment, a step of recognizing identification information of the power receiver with the power feeding device may be performed before the first step of detecting the position and the resonant frequency of the power receiver.

In power feeding performed by the power feeding device and the power receiver, a power signal is transmitted to the power receiver at an optimum frequency for high power transmission efficiency on the basis of the position and the resonant frequency information of the power receiver; accordingly, power can be supplied to the power receiver without waste.

Therefore, it is possible to provide a power feeding system and a power feeding method which are more convenient for a power feeding user, without causing increases in complexity and size of devices.

It is possible to provide a power feeding system and a power feeding method which also allow a power feeding provider (a company) which feeds power (at the power transmitting end) to supply power to a power receiver without waste.

It is possible to provide a power feeding system and a power feeding method which can offer a power feeding service efficient to both a user and a provider by specifying and managing a power feeding user at the power receiving end and properly controlling the amount of power supplied to a power receiver.

DETAILED DESCRIPTION OF THE INVENTION

Embodiments of the present invention will be described in detail below with reference to the drawings. Note that the present invention is not limited to the description below, and it is easily understood by those skilled in the art that modes and details disclosed herein can be modified in various ways. In addition, the present invention should not be construed as being limited to the description in the embodiments given below.

Note that ordinal numbers such as "first", "second", and "third" are used for convenience and do not denote the order of steps or the stacking order of layers. In addition, the ordinal numbers in this specification do not denote any particular names to define the invention.

Embodiment 1

In this embodiment, an embodiment of a wireless power feeding system and a wireless power feeding method is described with reference to FIGS. 1 to 4.

Figure 1:
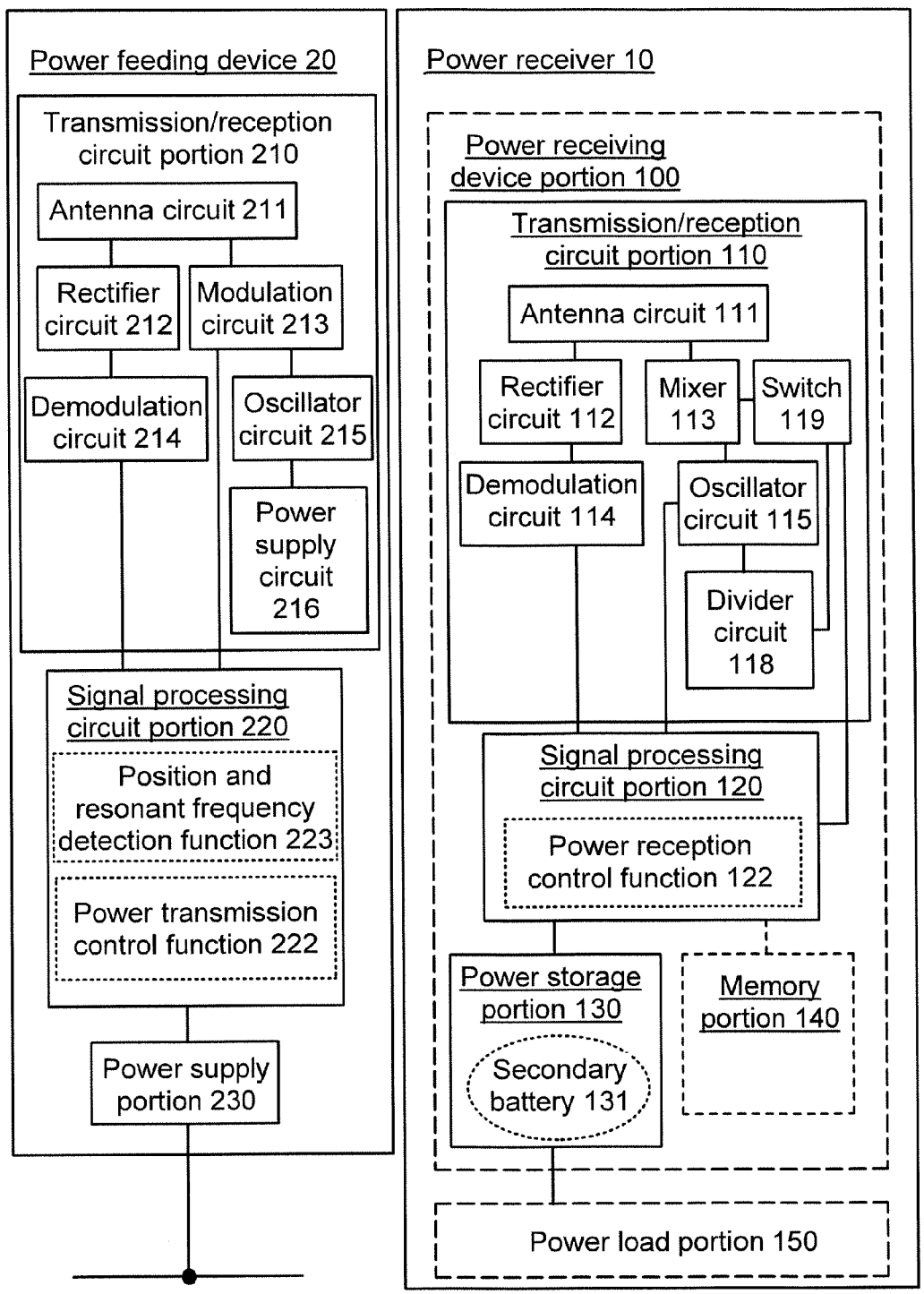
FIG. 1 illustrates an embodiment of a wireless power feeding system and a wireless power feeding method.

FIG. 1 illustrates components of a power feeding device and a power receiver included in the wireless power feeding system of this embodiment, in independent blocks which are classified according to their functions. However, there is not necessarily a one-to-one correspondence between components and functions, and the power feeding system may operate using a plurality of components and a plurality of functions in conjunction with each other.

In the wireless power feeding system in FIG. 1, a power feeding device 20 and a power receiver 10 transmit and receive signals to and from each other wirelessly (by an electromagnetic wave), and power is supplied from the power feeding device 20 to the power receiver 10 without contact.

The power feeding device 20 includes a transmission/reception circuit portion 210 which transmits and receives electromagnetic waves, a signal processing circuit portion 220 which processes electrical signals of the electromagnetic waves to be transmitted and received, and a power supply portion 230 which supplies power to be transmitted to the power receiver 10.

The transmission/reception circuit portion 210 includes an antenna circuit 211, a rectifier circuit 212, a modulation circuit 213, a demodulation circuit 214, an oscillator circuit 215, and a power supply circuit 216.

An electromagnetic wave (a signal) received by the antenna circuit 211 is converted into an electrical signal by the antenna circuit 211 and rectified in the rectifier circuit 212.

The rectified signal is demodulated in the demodulation circuit 214 and then transmitted to the signal processing circuit portion 220. On the other hand, a transmission signal generated in the signal processing circuit portion 220 is transmitted from the antenna circuit 211 to the power receiver 10 as an electromagnetic wave (a signal) when voltage is applied to the antenna circuit 211 by the modulation circuit 213 in response to a signal with a certain frequency generated in the power supply circuit 216 and the oscillator circuit 215. Note that the frequency of a signal transmitted from the oscillator circuit 215 is adjusted by the power supply circuit 216.

In the case where the transmission signal is a power signal for power transmission, the signal processing circuit portion 220 receives power from the power supply portion 230. The power supply portion 230 is connected to a power supply network or a power generation system in order to supply power to the power receiver 10.

The power receiver 10 includes a power receiving device portion 100 and a power load portion 150. The power receiving device portion 100 includes a transmission/reception circuit portion 110 which transmits and receives electromagnetic waves, a signal processing circuit portion 120 which processes electrical signals of the electromagnetic waves to be transmitted and received, a memory portion 140, and a power storage portion 130 including a secondary battery 131 which stores power transmitted from the power feeding device 20.

The transmission/reception circuit portion 110 includes an antenna circuit 111, a rectifier circuit 112, a mixer 113, a demodulation circuit 114, an oscillator circuit 115, a divider circuit 118, and a switch 119.

An electromagnetic wave (a signal) received by the antenna circuit 111 is converted into an electrical signal by the antenna circuit 111 and rectified in the rectifier circuit 112. The rectified signal is demodulated in the demodulation circuit 114 and then transmitted to the signal processing circuit portion 120. On the other hand, the oscillator circuit 115 operates in response to a transmission signal generated in the signal processing circuit portion 120. Then, a signal (a base carrier) generated in the oscillator circuit 115 is input to the divider circuit 118 and the mixer 113. The divider circuit 118 divides the frequency of the signal generated in the oscillator circuit 115, thereby generating signals having a plurality of frequencies which are lower than the frequency of the signal generated in the oscillator circuit 115. The switch 119 is controlled with a signal generated in the signal processing circuit portion 120. Then, one of the signals having the plurality of frequencies generated by the divider circuit 118 is selected by the switch 119 and transmitted to the mixer 113. The mixer 113 mixes the signal generated in the oscillator circuit 115 with the signal selected by the switch 119 from the signals generated by the divider circuit 118. The mixed signal (sub-carrier) is transmitted from the antenna circuit 111 to the power feeding device 20.

In response to the signal generated in the signal processing circuit portion 120, the switch 119 is selected plural times, and signals having a plurality of frequencies corresponding to the number of times the switch 119 is selected are transmitted to the mixer 113 and mixed with the signal generated in the oscillator circuit 115. Thus, a plurality of sub-carriers is transmitted from the antenna circuit 111 to the power feeding device 20.

Note that the divider circuit 118 is configured with plural stages of connected flip-flop circuits, latch circuits, or the like. The signals having the plurality of frequencies generated by the divider circuit 118 are determined by the number of stages of flip-flop circuits, latch circuits, or the like. For example, when the divider circuit 118 is configured with three stages of flip-flop circuits, latch circuits, or the like, three kinds of signals having a plurality of frequencies can be generated by the divider circuit 118.

In the case where the received electromagnetic wave is an electromagnetic wave for power reception, it is converted into an electrical signal by the antenna circuit 111, rectified in the rectifier circuit 112, and then stored as power (electrical energy) in the secondary battery 131 of the power storage portion 130 via the signal processing circuit portion 120.

The secondary battery 131 is a power storage means. For example, a lead-acid battery, a nickel-cadmium battery, a nickel-hydride battery, a lithium-ion battery, or the like can be used.

Note that in the block diagrams in FIG. 1, a DC-DC converter can be provided as appropriate. In addition, in the power storage portion 130, a power supply circuit or an overcharge control circuit for controlling operation of the power supply circuit so as to prevent overcharging of the secondary battery 131 may be provided as appropriate, and the power supply circuit can supply power (electrical energy) stored in the secondary battery 131 to the power load portion 150 as a constant voltage.

The power storage portion 130 may include a discharge control circuit. The discharge control circuit has a function to control the supply of power or the amount of power to be supplied to the power load portion 150. The discharge control circuit makes it possible to supply power as needed or adjust the amount of power to be supplied.

Although not illustrated in FIG. 1 (and FIG. 6), the power receiving device portion 100 includes a power supply circuit and a capacitor for generating power to be supplied to the power receiving device portion 100. In the transmission/reception circuit portion 110, power is generated from the signal received by the antenna circuit 111. The rectifier circuit is used for the generation of power. The generated power is supplied to the transmission/reception circuit portion 110, the signal processing circuit portion 120, and the memory portion 140. Note that in the case where power is stored in the secondary battery 131 of the power storage portion 130, power may be supplied from the secondary battery 131 to the transmission/reception circuit portion 110, the signal processing circuit portion 120, the memory portion 140, and the like. In the case of the configuration where power is supplied from the secondary battery 131, the power supply circuit and the capacitor for generating power to be supplied to the power receiving device portion 100 are not necessarily provided.

The signal processing circuit portion 220 of the power feeding device 20 has a position and resonant frequency detection function 223 to detect the distance to the power receiver 10 and the resonant frequency of the power receiver 10, and a power transmission control function 222 to control power to be transmitted to the power receiver 10.

On the other hand, the signal processing circuit portion 120 of the power receiver 10 has a power reception control function 122 to control power to be received from the power feeding device 20.

The power feeding device 20 which wirelessly supplies power to the power receiver 10 detects the position and the resonant frequency of the power receiver 10 to be supplied with power and controls the frequency of a power signal to be transmitted to the power receiver 10 on the basis of the information.

Note that in this specification, the distance between the power feeding device 20 and the power receiver 10 is the shortest distance between an antenna provided in the power feeding device 20 and an antenna of the power receiver 10.

Figure 4:
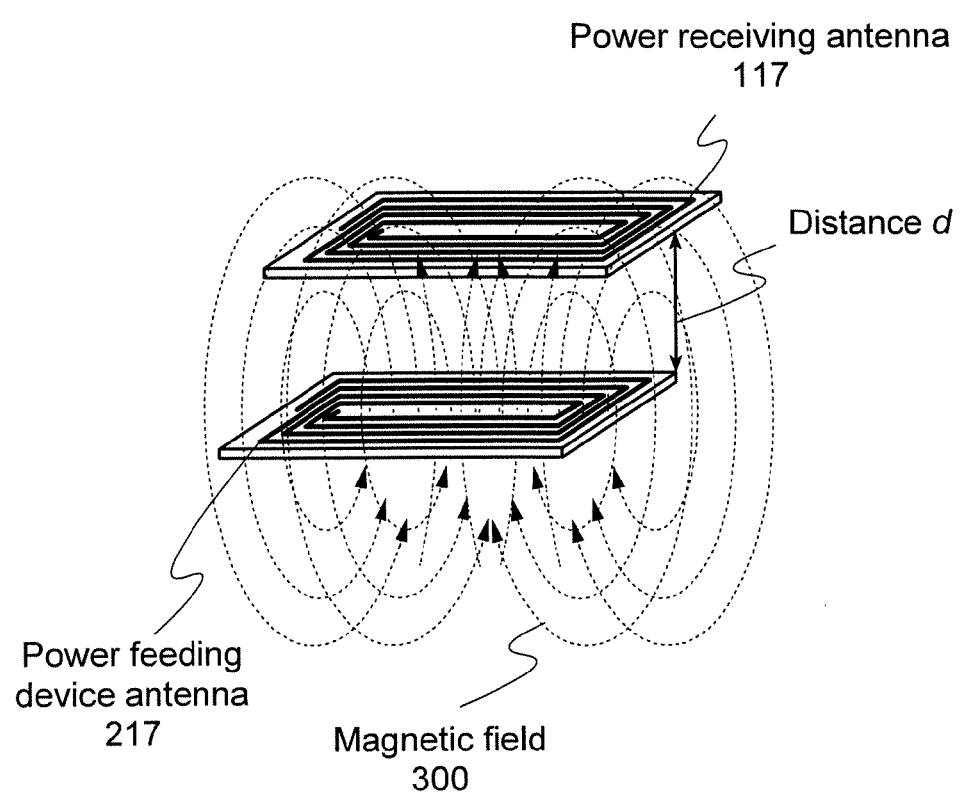
FIG. 4 illustrates an embodiment of a wireless power feeding system and a wireless power feeding method.

FIG. 4 illustrates an example of power feeding with a distance d between a power receiver antenna 117 provided in the power receiver 10 and a power feeding device antenna 217 provided in the power feeding device 20. In FIG. 4, the power receiver antenna 117 and the power feeding device antenna 217 are disposed at a distance d from each other, and power feeding is performed by generating a magnetic field 300. FIG. 4 illustrates an example of power feeding by an electromagnetic induction method using coil antennas as the antennas, and illustrates one embodiment of the shape of antennas and the method for transmitting electromagnetic waves which can be employed in the invention disclosed in this specification.

In this specification, there is no particular limitation on the frequency of a power feeding electromagnetic wave and the frequency may be in any frequency band as long as power can be transmitted. For example, the frequency of a power feeding electromagnetic wave may be in any of an LF band of 135 kHz (long wave), an HF band of 13.56 MHz, a UHF band of 900 MHz to 1 GHz, and a microwave band of 2.45 GHz.

In this specification, the frequency of electromagnetic waves used as a variety of signals (such as an electrical signal transmitting identification information and the like and a position and resonant frequency detection signal) may be in the same frequency band as a power feeding electromagnetic wave or may be in a different frequency band. Note that in the case of using frequencies in different frequency bands, separate antennas for the frequencies are preferably provided.

In this specification, the method of transmitting electromagnetic waves may be appropriately selected from a variety of methods such as an electric field coupling method, an electromagnetic induction method, a resonance method, and a microwave method. In order to prevent energy loss due to foreign substances containing moisture, such as rain and mud, the electromagnetic induction method or the resonance method using a low frequency band, specifically, frequencies of a short wave of 3 MHz to 30 MHz, a medium wave of 300 kHz to 3 MHz, a long wave of 30 kHz to 300 kHz, or an ultralong wave of 3 kHz to 30 kHz, is preferably used.

One example of wireless power feeding is a power feeding method using an antenna. With a certain antenna shape, the efficiency of transmission of power fed from the power feeding device 20 to the power receiver 10 depends on the frequency of a power signal to be transmitted, the distance between the power feeding device 20 and the power receiver 10, the resonant frequency specific to the power receiver 10, or the like.

If the frequency of a power signal to be transmitted is fixed to a given value $f_0$, the efficiency of transmission of power fed from the power feeding device to the power receiver reaches the maximum value when the distance between the power feeding device and the power receiver is $d_{MAX(0)}$.

The distance $d_{MAX}$ with which the efficiency of transmission of power fed from the power feeding device to the power receiver reaches the maximum value varies with the frequency f of the power signal to be transmitted and is specific to the frequency f of each power signal.

Therefore, if the distance between the power feeding device 20 and the power receiver 10 is fixed to a given value $d_0$, it is possible to determine the frequency $f_{MAX(0)}$ of a power signal, at which the efficiency of transmission of power fed from the power feeding device 20 to the power receiver 10 reaches the maximum value.

As described above, if the distance between the power feeding device 20 and the power receiver 10 is fixed to a given value $d_0$, the frequency (the resonant frequency) at which the power transmission efficiency reaches the maximum value can be uniquely determined. In a wireless power feeding system disclosed in this specification, in order to obtain the resonant frequency at which the power transmission efficiency reaches the maximum value, a power receiver transmits a plurality of signals having different frequencies to a power feeding device. A feature is that signals (sub-carriers) having different frequencies which are to be transmitted from the power receiver to the power feeding device are generated on the basis of a base carrier used for wireless power feeding.

Then, the power feeding device 20 receives the plurality of signals (sub-carriers) having different frequencies which is transmitted from the power receiver 10. Next, the power feeding device 20 selects a signal having a frequency with the highest intensity (a resonant frequency) from the plurality of received signals (sub-carriers) having different frequencies. Furthermore, the power feeding device 20 transmits a power transmission signal to the power receiver 10 at the resonant frequency.

In the above manner, power can be supplied to the power receiver without waste by transmitting a power signal to the power receiver at an optimum frequency (a resonant frequency) for high power transmission efficiency.

Accordingly, the power receiver transmits a plurality of signals having different frequencies to the power feeding device, as a signal for detecting the position relative to the power feeding device and the resonant frequency.

Figure 2:
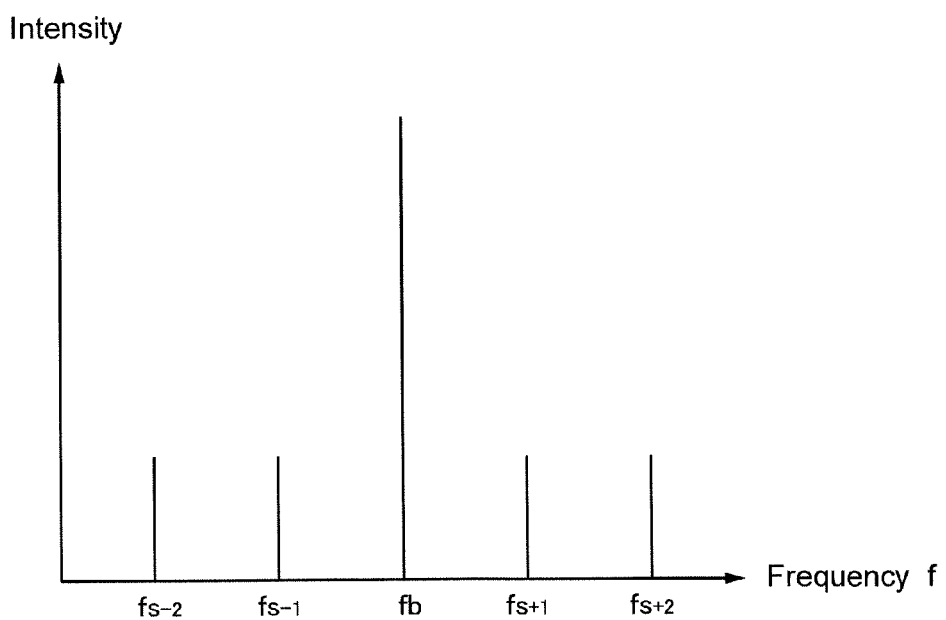
FIG. 2 illustrates the relationship between the frequency and the intensity of an electrical signal.

A sub-carrier defined in this specification will be described with reference to FIG. 2. A base carrier $f_b$ that is a signal generated by the oscillator circuit 115 and having a reference frequency and signals generated by the divider circuit 118 and having a plurality of frequencies are mixed together using the mixer 113; thus, a plurality of sub-carriers $f_{s-2}$, $f_{s-1}$, $f_{s+1}$, $f_{s+2}$ . . . is generated. The frequencies of the sub-carriers are at regular intervals relative to the frequency of the base carrier $f_b$. In addition, the intensities of the sub-carriers are lower than the intensity of the base carrier.

In order to generate a plurality of signals having different frequencies by adjusting the base carrier to a base carrier having a different frequency, a circuit for adjusting a frequency by adjusting a voltage, such as a power supply circuit, is needed. The addition of such a circuit may lead to increases in complexity and size of devices in a power feeding system and may also result in an increase in manufacturing cost.

In this embodiment, as the plurality of signals having different frequencies which is to be transmitted from the power receiver, a plurality of sub-carriers $f_s$ generated on the basis of a base carrier $f_b$ is used. The sub-carriers $f_s$ can be adjusted relative to the base carrier $f_b$ by the switch 119 provided between the mixer 113 and the divider circuit 118.

By providing the switch 119 between the mixer 113 and the divider circuit 118 to effectively use a plurality of different sub-carriers, there is no need to additionally provide a circuit for adjusting a frequency by adjusting a voltage, such as a power supply circuit, and it is therefore possible to suppress increases in complexity and size of devices and an accompanying increase in manufacturing cost.

An embodiment of a wireless power feeding method is described with reference to a flow chart of FIG. 3. Note that a power feeding device K corresponds to the power feeding device 20 in FIG. 1 and a power receiver J corresponds to the power receiver 10 in FIG. 1.

First, the power receiver J transmits a position and resonant frequency detection signal to the power feeding device K (JB1: Transmission of position and resonant frequency detection signal). As the position and resonant frequency detection signal, a plurality of signals having different frequencies can be used. The power feeding device K receives the position and resonant frequency detection signal of the power receiver J (KB1: Reception of position and resonant frequency defection signal), and detects the position and resonant frequency of the power receiver J with the intensities and times of the plurality of received electrical signals having different frequencies (KB2: Detection of position and resonant frequency) (B: Position and resonant frequency detection step).

The power feeding device K may store information used for the detection (such as the relationship between transmission efficiency and a transmission distance at a resonant frequency) in a memory portion of the power feeding device K in advance. Alternatively, at the time of detection, the power feeding device K may communicate with another management server or the like and perform detection on the basis of information obtained from the server.

The power feeding device K adjusts the frequency of a power signal to be transmitted, on the basis of the detected position and resonant frequency of the power receiver J, so as to obtain the maximum power transmission efficiency (KC1: Adjustment of power transmission frequency). Power can be supplied to the power receiver without waste by transmitting a power signal to the power receiver at an optimum frequency for high power transmission efficiency. As a result, power feeding which is efficient and convenient for both the power feeding device K and the power receiver J can be performed.

The power feeding device K transmits a power transmission start signal to the power receiver J (KC2: Transmission of power transmission start signal), and the power receiver J receives the power transmission start signal (JD1: Reception of power transmission start signal) and transmits a power reception start signal when it is ready for power reception (JD2: Transmission of power reception start signal). The power feeding device K receives the power reception start signal from the power receiver J (KC3: Reception of power reception start signal) and starts power transmission (KC4: Start of power transmission). By power transmission from the power feeding device K, the power receiver J starts power reception (JD3: Start of power reception).

The power feeding device K transmits a power transmission end signal to the power receiver J by using the power transmission control function 222 after transmitting a proper amount of power (KC5: Transmission of power transmission end signal). The power receiver J receives the power transmission end signal from the power feeding device K (JD4: Reception of power transmission end signal), then transmits a power reception end signal to the power feeding device K (JD5: Transmission of power reception end signal), and ends the power reception (JD6: End of power reception) (D: Power reception control step). The power feeding device K receives the power reception end signal from the power receiver J (KC6: Reception of power reception end signal) and also ends the power transmission (KC7: End of power transmission) (C: Power transmission control step).

Note that the start or end of power transmission from the power feeding device K may be at the same time as the transmission of the power transmission start signal or the transmission of the power transmission end signal. The start or end of power reception may also be at the same time as the transmission of the power reception start signal or the transmission of the power reception end signal. Since the power transmission and the power reception occur in conjunction with each other, the power reception by the power receiver J can be started at the same time as the start of power transmission from the power feeding device K, and the power reception by the power receiver J can be ended at the same time as the end of power transmission from the power feeding device K. FIG. 3 illustrates an example where the power feeding device K signals the end of power feeding to the power receiver J and ends the power transmission, but the power receiver J can request the end of power feeding of the power feeding device K to end the power transmission from the power feeding device K.

As a result, the power load portion 150 can be operated using power stored in the secondary battery 131 of the power storage portion 130 of the power receiving device portion 100. In this specification, a power receiver means an object which operates using received power as a driving power, and examples of the power receiver include portable electronic devices such as mobile phones, notebook personal computers, cameras such as digital cameras or digital video cameras, digital photo frames, portable game machines, personal digital assistants, and electronic books, transportation means driven by an electric motor using power (automobiles (automatic two-wheeled vehicles, three or more-wheeled automobiles), motorized bicycles including motor-assisted bicycles, aircrafts, ships, and railroad cars), and the like.

Figure 10:
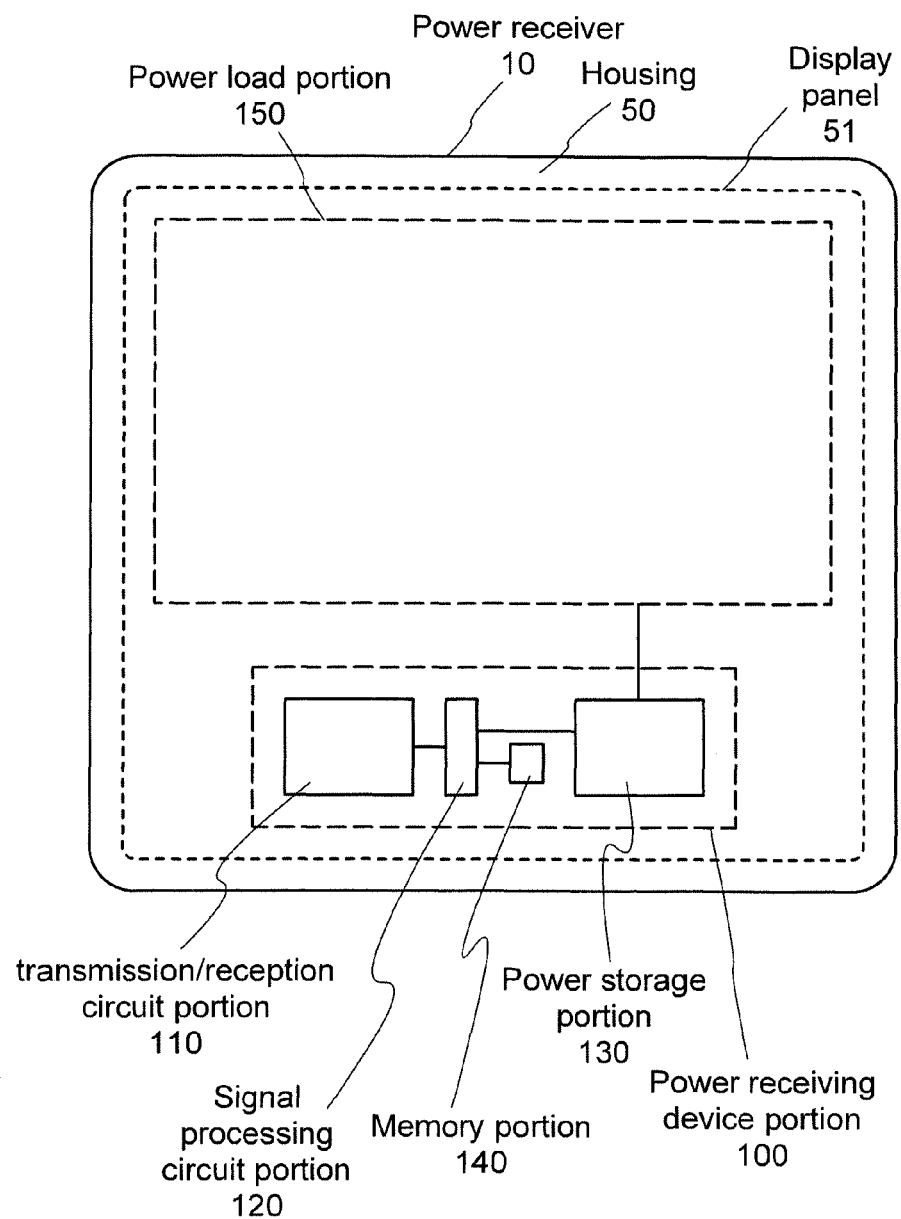
FIG. 10 illustrates an embodiment of a power receiver.

FIG. 10 illustrates a personal digital assistant (PDA) as an example of the power receiver. The power receiver 10 in FIG. 10 is a personal digital assistant including a display panel 51 in a housing 50. In the housing 50, the power receiving device portion 100 and the power load portion 150 are provided under the display panel 51. The power receiving device portion 100 includes the transmission/reception circuit portion 110 which includes the antenna circuit 111, the rectifier circuit 112, the mixer 113, the demodulation circuit 114, the oscillator circuit 115, and the like, the signal processing circuit portion 120, the memory portion 140, and the power storage portion 130 including the secondary battery 131. An electromagnetic wave received by the transmission/reception circuit portion 110 is stored in the secondary battery 131 of the power storage portion 130 via the signal processing circuit portion 120. By the supply of power stored in the secondary battery 131 to the power load portion 150, a semiconductor integrated circuit and the like provided in the power load portion 150 can be driven and an image can be displayed on the display panel 51; thus, the power receiver 10 can be operated as a personal digital assistant.

The power feeding system and the power feeding method in this embodiment enable a user of the power receiver to obtain more convenience and higher added values, without causing increases in complexity and size of devices.

It is also possible to provide a company at the power feeding end with a power feeding system and a power feeding method which can offer a variety of efficient services.

Embodiment 2

Figure 5:
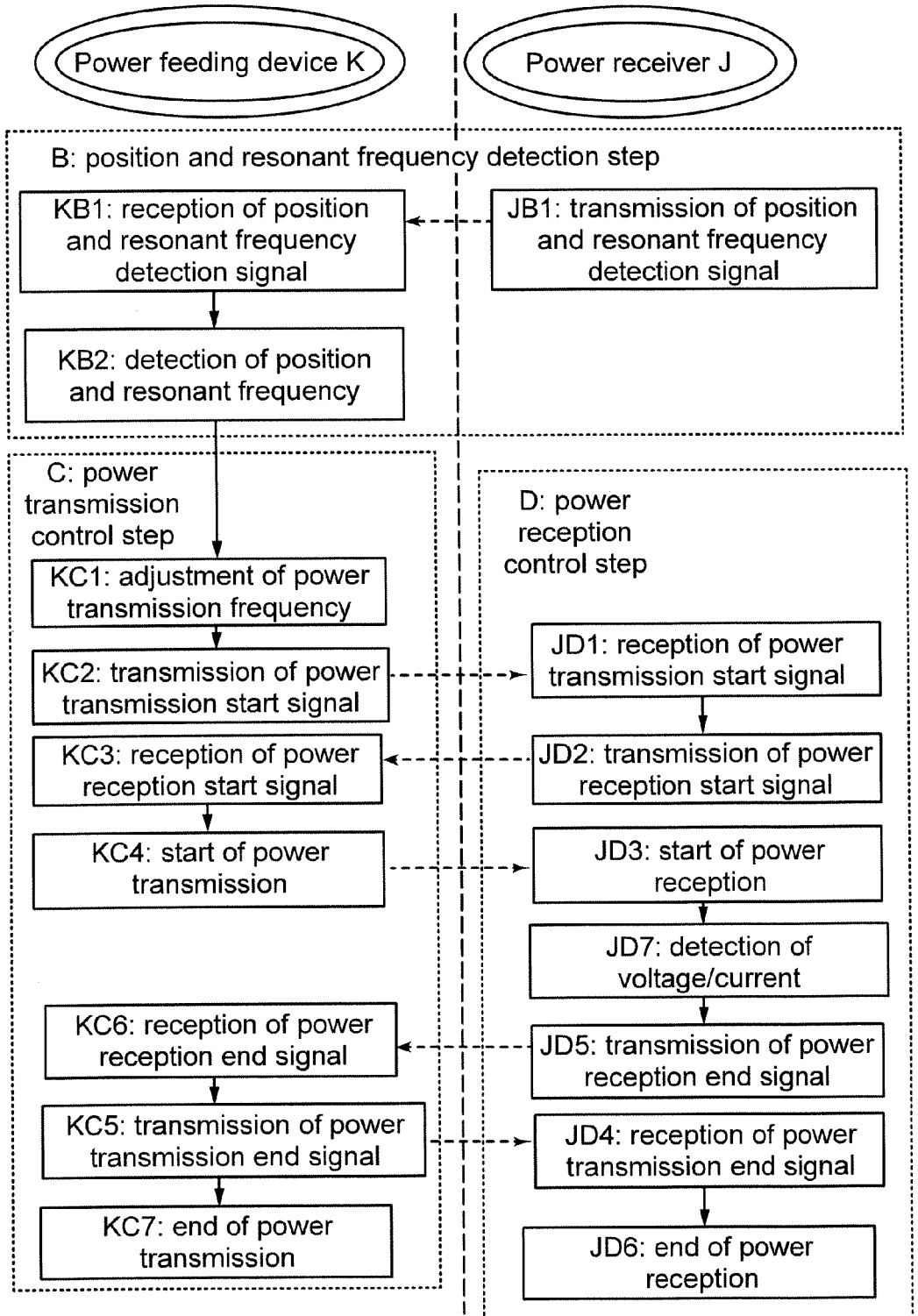
FIG. 5 illustrates an embodiment of a wireless power feeding system and a wireless power feeding method.

In this embodiment, another embodiment of a wireless power feeding system and a wireless power feeding method is described with reference to FIG. 5 and FIG. 6.

Figure 6:
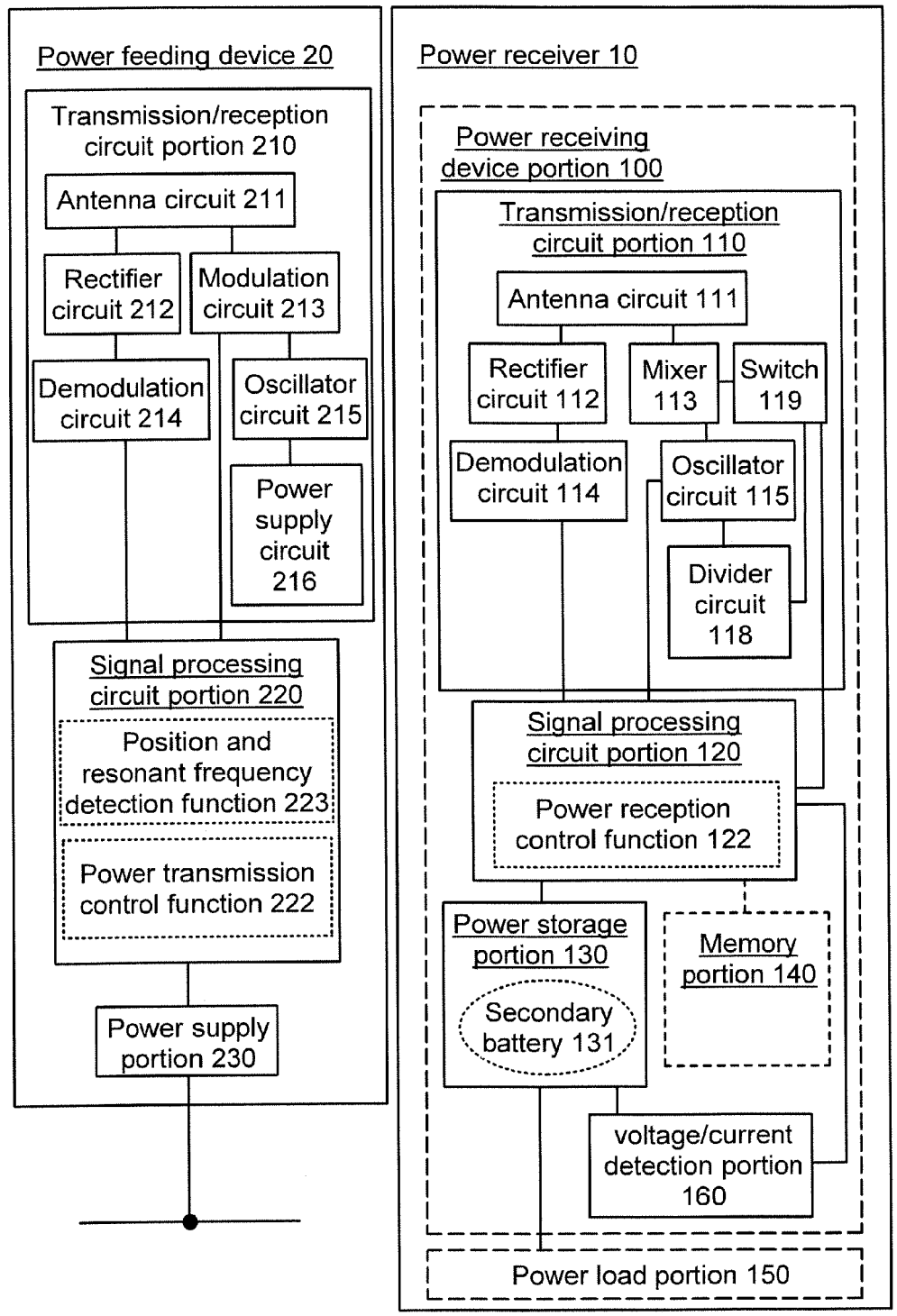
FIG. 6 illustrates an embodiment of a wireless power feeding system and a wireless power feeding method.

FIG. 6 illustrates components of a power feeding device and a power receiver included in the wireless power feeding system of this embodiment, in independent blocks which are classified according to their functions. FIG. 6 illustrates an example where a detection portion (a voltage/current detection portion 160) which detects the amount of power stored in the secondary battery 131 of the power storage portion 130 is provided in the wireless power feeding system in FIG. 1 described in Embodiment 1. The same portions as or portions having functions similar to those in Embodiment 1 are similar to those in Embodiment 1 and repetitive description will be omitted. In addition, detailed description of the same portions is not repeated.

The voltage/current detection portion 160 detects the voltage, the current, or the voltage and current outputted from the secondary battery 131 of the power storage portion 130 to find out the amount of power stored in the secondary battery 131 and transmits the information to the signal processing circuit portion 120, so that the signal processing circuit portion 120 controls power reception.

An embodiment of a wireless power feeding method is described with reference to a flow chart of FIG. 5. Note that a power feeding device K corresponds to the power feeding device 20 in FIG. 6 and a power receiver J corresponds to the power receiver 10 in FIG. 6.

Figure 3:
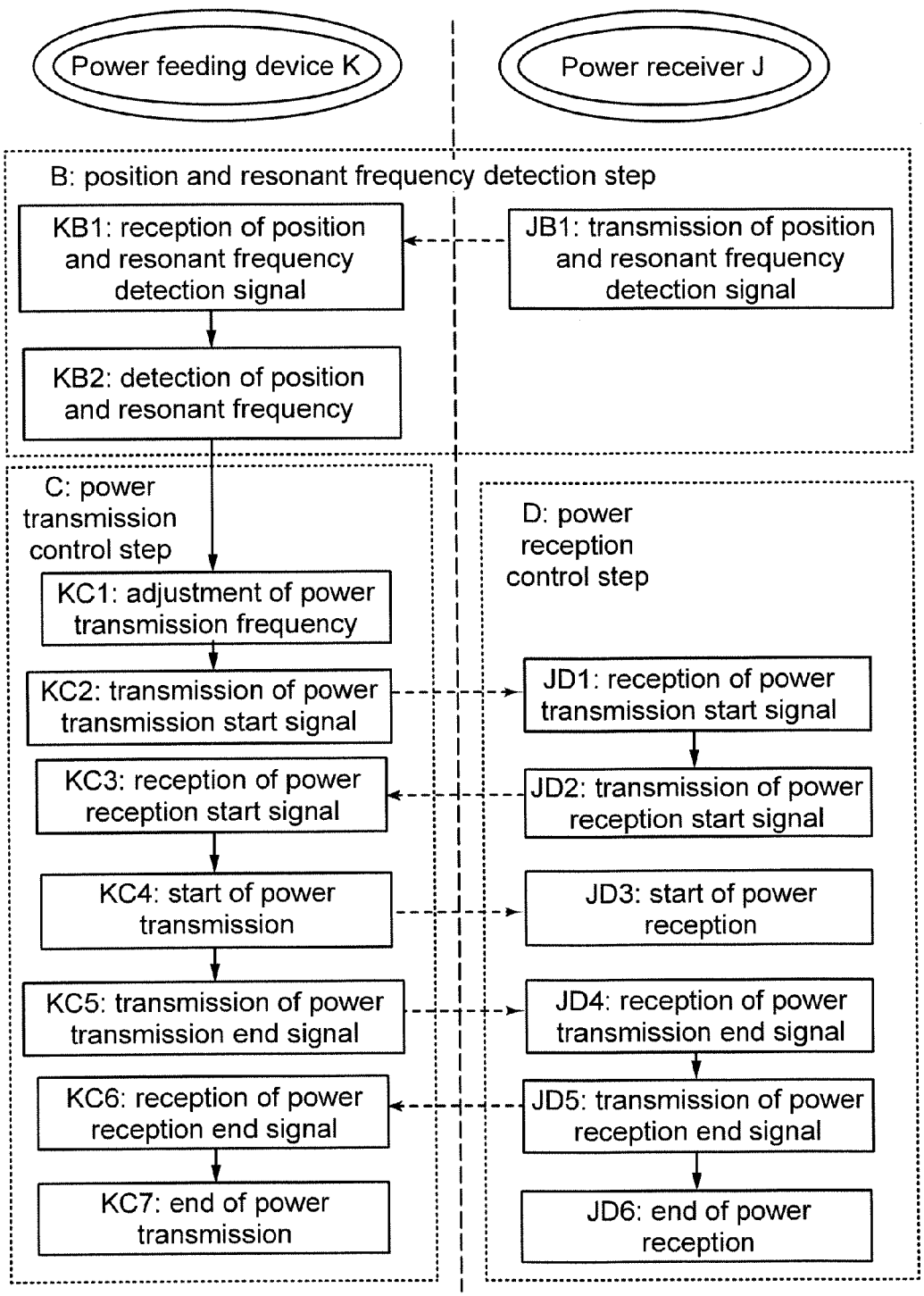
FIG. 3 illustrates an embodiment of a wireless power feeding system and a wireless power feeding method.

A position and resonant frequency detection step is similar to that in FIG. 3 in Embodiment 1 and is thus not described.

A power transmission control step and a power reception control step are described.

The power feeding device K adjusts the frequency of a power signal to be transmitted, on the basis of the detected position and resonant frequency of the power receiver J, so as to obtain the maximum power transmission efficiency (KC1: Adjustment of power transmission frequency). Power can be supplied to the power receiver without waste by transmitting a power signal to the power receiver J at an optimum frequency for high power transmission efficiency. As a result, power feeding which is efficient and convenient for both the power feeding device K and the power receiver J can be performed.

The power feeding device K transmits a power transmission start signal to the power receiver J (KC2: Transmission of power transmission start signal), and the power receiver J receives the power transmission start signal (JD1: Reception of power transmission start signal) and transmits a power reception start signal when it is ready for power reception (JD2: Transmission of power reception start signal). The power feeding device K receives the power reception start signal from the power receiver J (KC3: Reception of power reception start signal) and starts power transmission (KC4: Start of power transmission). By power transmission from the power feeding device K, the power receiver J starts power reception (JD3: Start of power reception).

In this embodiment, an example is described in which information on the amount of power stored in the secondary battery 131, which is detected by the voltage/current detection portion 160, is also used to control power feeding. At the start of power reception by the power receiver J, the voltage/current detection portion 160 detects the voltage, the current, or the voltage and current outputted from the secondary battery 131 (JD7: Detection of voltage/current).

The voltage/current detection portion 160 finds out the amount of power stored in the secondary battery 131 by detecting the voltage, the current, or the voltage and current outputted from the secondary battery 131. When the power receiver J determines that the amount of power exceeds the capacity of the secondary battery 131, it transmits a power reception end signal to the power feeding device K (JD5: Transmission of power reception end signal).

The power feeding device K receives the power reception end signal from the power receiver J (KC6: Reception of power reception end signal), then transmits a power transmission end signal to the power receiver J (KC5: Transmission of power transmission end signal), and ends the power transmission (KC7: End of power transmission). The power receiver J receives the power transmission end signal from the power feeding device K (JD4: Reception of power transmission end signal) and ends the power reception (JD6: End of power reception).

In this manner, the power receiver J can request the end of power feeding of the power feeding device K to end the power transmission from the power feeding device K.

As the plurality of signals having different frequencies which is to be transmitted from the power receiver in order to detect the position relative to the power feeding device and the resonant frequency, a plurality of sub-carriers $f_s$ generated on the basis of a base carrier $f_b$ is used. The sub-carriers $f_s$ can be adjusted relative to the base carrier $f_b$ by a switch provided between a mixer and a divider circuit.

By providing a switch between a mixer and a divider circuit to effectively use a plurality of different sub-carriers, there is no need to additionally provide a circuit for adjusting a frequency by adjusting a voltage, such as a power supply circuit, and it is therefore possible to suppress increases in complexity and size of devices and an accompanying increase in manufacturing cost.

In power feeding performed by the power feeding device and the power receiver, a power signal is transmitted to the power receiver at an optimum frequency for high power transmission efficiency on the basis of the position and resonant frequency information of the power receiver; accordingly, power can be supplied to the power receiver without waste.

Furthermore, by finding out the amount of power stored in the secondary battery, power transmission which is more proper to the user request can be performed. Thus, it is possible to reduce the waste of power due to excessive power transmission and the deterioration of the secondary battery 131 due to the supply of power over the capacity. As a result, power feeding which is efficient and convenient for both the power feeding device and the power receiver can be performed.

Accordingly, it is possible to provide a power feeding system and a power feeding method which can offer a power feeding service efficient to both a user and a provider.

This embodiment can be implemented in an appropriate combination with the configurations described in the other embodiments.

Embodiment 3

Figure 7:
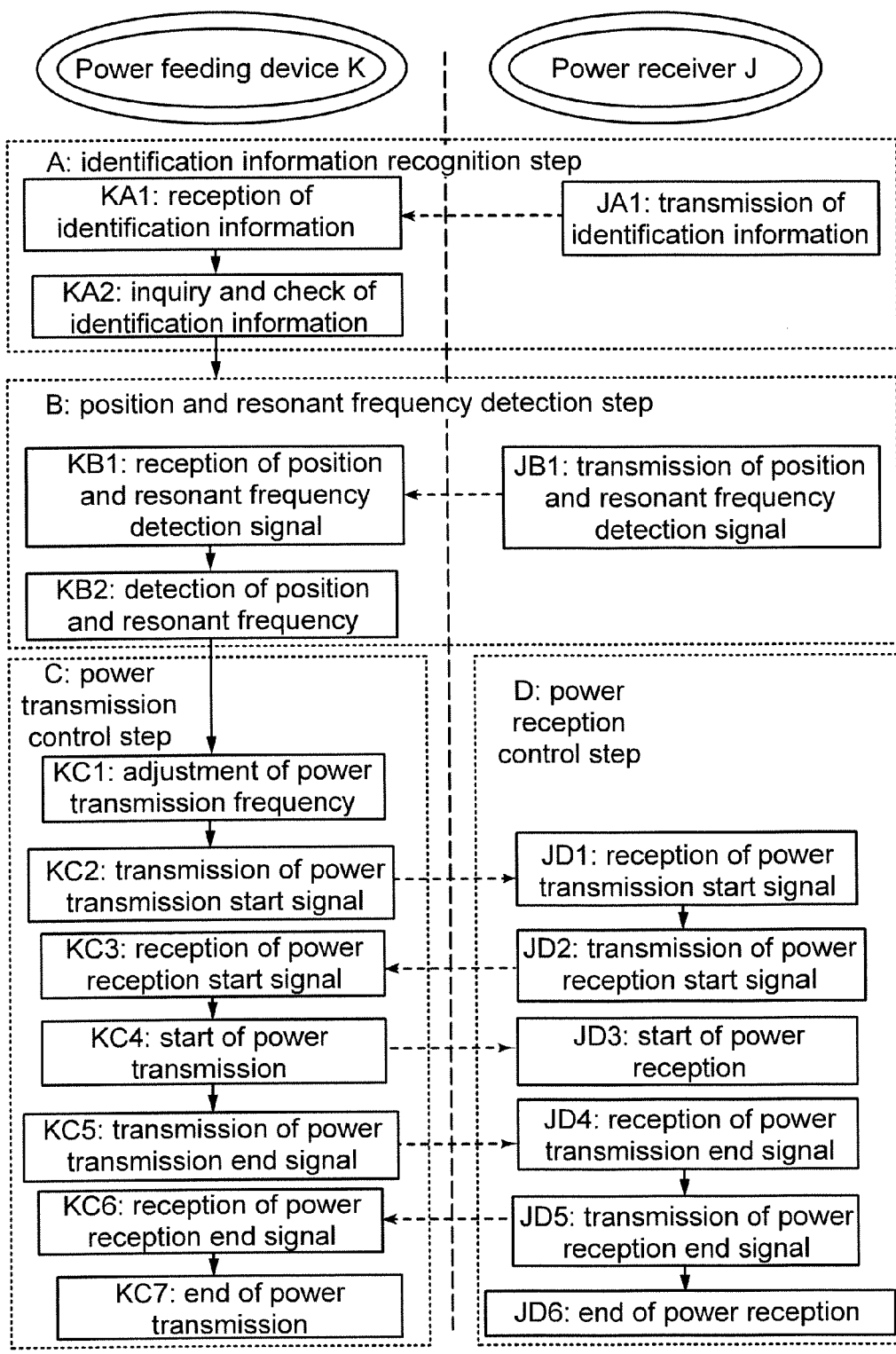
FIG. 7 illustrates an embodiment of a wireless power feeding system and a wireless power feeding method.

In this embodiment, another embodiment of a wireless power feeding system and a wireless power feeding method is described with reference to FIG. 7 and FIGS. 8A and 8B.

In this embodiment, an example is described in which a step of recognizing identification information of the power receiver is added before the position and resonant frequency detection step in Embodiment 1 or 2. The same portions as or portions having functions similar to those in Embodiment 1 or 2 are similar to those in Embodiment 1 or 2 and repetitive description will be omitted. In addition, detailed description of the same portions is not repeated.

Identification information can be stored in the memory portion of the power receiver. In addition, the signal processing circuit portion of the power feeding device has an identification function to identify the identification information.

A wireless power feeding method of this embodiment is described with reference to a flow chart of FIG. 7. Note that a power feeding device K corresponds to the power feeding device 20 in FIG. 1 and a power receiver J corresponds to the power receiver 10 in FIG. 1.

First, the power receiver J transmits identification information to the power feeding device K (JA1: Transmission of identification information), and the power feeding device K receives the identification information of the power receiver J (KA1: Reception of identification information). The power feeding device K inquires for and checks the received identification information (KA2: Inquiry and check of identification information), and identifies the power receiver J (A: Identification information recognition step). The process proceeds to the next step, and power feeding is performed in a manner similar to the power feeding method in FIG. 3 or FIG. 5.

The power feeding device K may store information for the identification in the memory portion of the power feeding device K in advance. Alternatively, at the time of identification, the power feeding device K may communicate with another management server or the like and perform identification on the basis of information obtained from the server. Alternatively, communication between the power feeding device K and the power receiver J may be started from the power feeding device K. For example, in the case where the power feeding device K have obtained identification information of the power receiver J, communication may be started by transmission of a signal for inquiring about identification information to the power receiver J in order to identify (search for) the power receiver J having the identification information.

The power feeding device K can adjust the intensity of a power signal to be transmitted, on the basis of the identification information of the power receiver J. For example, by reading and considering the amount of power which can be stored in the secondary battery 131 of the power receiver J on the basis of the identification information, the intensity and frequency of an electromagnetic wave to be transmitted, the power transmission time, and the like can be controlled.

Figure 8A:
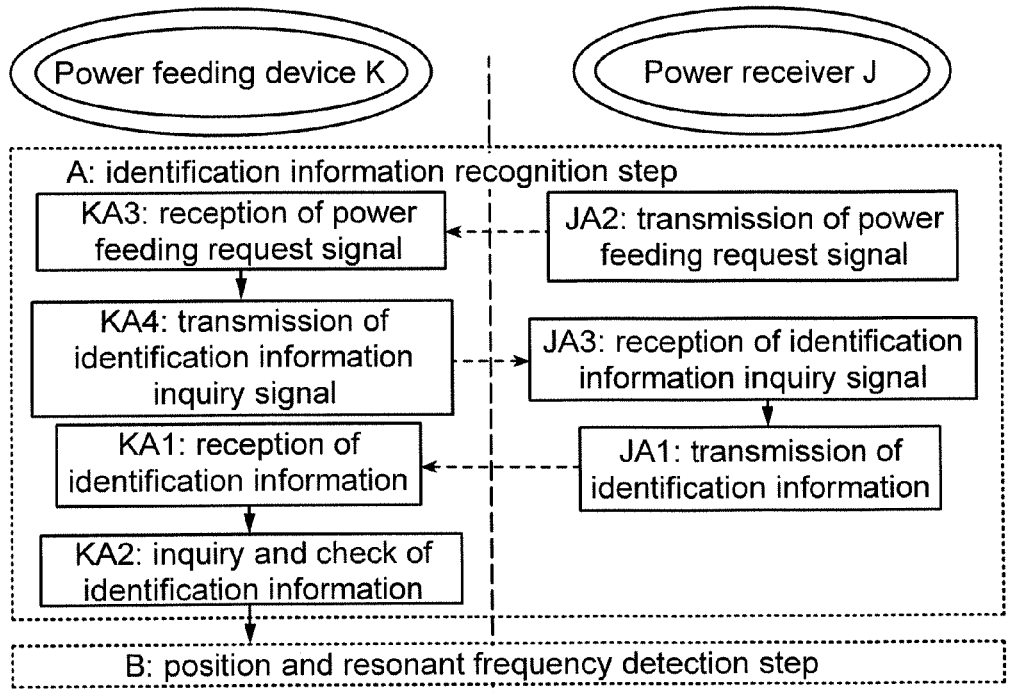
FIGS. 8A and 8B each illustrate an embodiment of a wireless power feeding system and a wireless power feeding method.

Alternatively, as in FIG. 8A, the power receiver J can request the start of power feeding of the power feeding device K to start power transmission from the power feeding device K. FIG. 8A illustrates the identification information recognition step. First, the power receiver J transmits a signal for requesting power feeding to the power feeding device K (JA2: Transmission of power feeding request signal). The power feeding device K which is placed in a position where it can receive the power feeding request signal from the power receiver J receives the power feeding request signal (KA3: Reception of power feeding request signal) and transmits a signal for inquiring about identification information of the power receiver J to the power receiver J in response to the power feeding request signal (KA4: Transmission of identification information inquiry signal). The power receiver J receives the identification information inquiry signal from the power feeding device K (JA3: Reception of identification information inquiry signal) and transmits identification information of the power receiver J to the power feeding device K (JA1: Transmission of identification information). The power feeding device K receives identification information from the power receiver J (KA1: Reception of identification information), inquires for and checks the received identification information (KA2: Inquiry and check of identification information), and identifies the power receiver J. The process proceeds to the next step, and power feeding is performed in a manner similar to the power feeding method in FIG. 3 or FIG. 5.

The transmission of the power feeding request signal from the power receiver J may be controlled by a user in consideration of the amount of power stored in the secondary battery of the power receiver J. Alternatively, the transmission of the power feeding request signal from the power receiver J may be set so as to be automatically performed depending on the amount of power stored in the secondary battery 131.

Figure 8B:
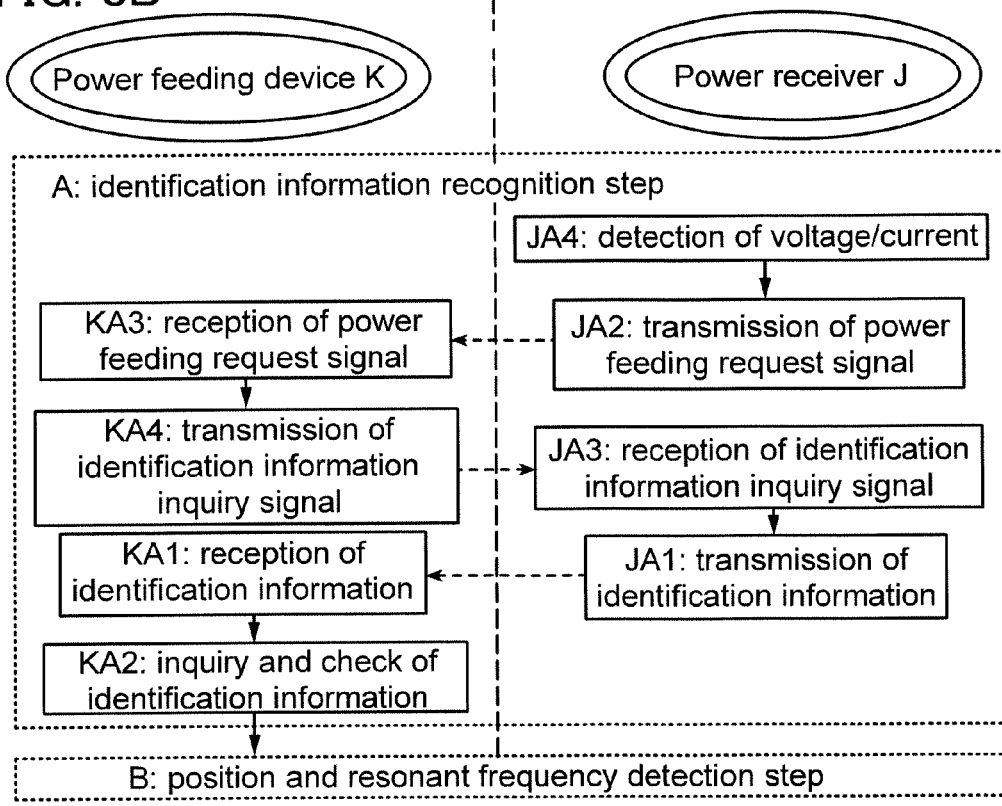

For example, as illustrated in FIG. 8B, the voltage/current detection portion 160 detects the voltage, the current, or the voltage and current outputted from the secondary battery 131 (JA4: Detection of voltage/current), and when the power receiver J determines that the amount of power stored in the secondary battery 131 is smaller than a certain amount of power, it transmits a power feeding request signal to the power feeding device K (JA2: Transmission of power feeding request signal). The process proceeds to the next step, and power feeding is performed in a manner similar to the power feeding method in FIG. 8A and FIG. 3 or FIG. 5.

Also in this embodiment, as a plurality of signals having different frequencies which is to be transmitted from a power receiver, a plurality of sub-carriers $f_s$ generated on the basis of a base carrier $f_b$ is used. The sub-carriers $f_s$ can be adjusted relative to the base carrier $f_b$ by a switch provided between a mixer and a divider circuit.

By providing a switch between a mixer and a divider circuit to effectively use a plurality of different sub-carriers, there is no need to additionally provide a circuit for adjusting a frequency by adjusting a voltage, such as a power supply circuit, and it is therefore possible to suppress increases in complexity and size of devices and an accompanying increase in manufacturing cost.

In power feeding performed by the power feeding device and the power receiver, a power signal is transmitted to the power receiver at an optimum frequency for high power transmission efficiency on the basis of the position and resonant frequency information of the power receiver; accordingly, power can be supplied to the power receiver without waste.

Furthermore, by finding out the specific information of the power receiver J or the amount of power stored in the secondary battery, power transmission which is adapted to the user request can be performed. Thus, it is possible to reduce the waste of power due to excessive power transmission and the deterioration of the secondary battery 131 due to the supply of power over the capacity. As a result, power feeding which is efficient and convenient for both the power feeding device K and the power receiver J can be performed.

In addition, it is preferable to take measures for security, such as updating identification information including specific information like personal information for each power feeding, deleting unnecessary identification information from a power feeding device after finishing a recognition step for power feeding, or encrypting communication when transmitting identification information.

It is possible to provide a power feeding system and a power feeding method which can offer a power feeding service efficient to both a user and a provider, without causing increases in complexity and size of devices.

This embodiment can be implemented in an appropriate combination with the configurations described in the other embodiments.

Embodiment 4

In this embodiment, another embodiment of a wireless power feeding system and a wireless power feeding method is described with reference to FIG. 9.

The power feeding system and the power feeding method in this specification can also be applied to a plurality of power feeding devices and a plurality of power receivers. In this embodiment, an example is described in which the power feeding system and the power feeding method described in any of Embodiments 1 to 3 are applied to a plurality of power feeding devices and a plurality of power receivers. The same portions as or portions having functions similar to those in any of Embodiments 1 to 3 are similar to those in any of Embodiments 1 to 3 and repetitive description will be omitted. In addition, detailed description of the same portions is not repeated.

For example, in the case where power is fed from one power feeding device to a plurality of power receivers, the position and the resonant frequency of each of the power receivers can be found, and the frequency of a power signal to be transmitted can be controlled so as to obtain optimum power transmission efficiency. FIG. 9 illustrates an example where power is fed to each of power receivers Ja 10a, Jb 10b, and Jc 10c.

The power receivers Ja 10a, Jb 10b, and Jc 10c are placed at different distances from a power feeding device K 20 and have specific resonant frequencies.

The power feeding device K 20 feeds power by obtaining the position and resonant frequency information of the power receivers Ja 10a, Jb 10b, and Jc 10c and determining the frequencies f(d(Ja)), f(d(Jb)), and f(d(Jc)) of power signals to be transmitted, on the basis of the information, so as to obtain optimum power transmission efficiency for each of the power receivers.

Also in this embodiment, as a plurality of signals having different frequencies which is to be transmitted from a power receiver, a plurality of sub-carriers $f_s$ generated on the basis of a base carrier $f_b$ is used. The sub-carriers $f_s$ can be adjusted relative to the base carrier $f_b$ by a switch provided between a mixer and a divider circuit.

By providing a switch between a mixer and a divider circuit to effectively use a plurality of different sub-carriers, there is no need to additionally provide a circuit for adjusting a frequency by adjusting a voltage, such as a power supply circuit, and it is therefore possible to suppress increases in complexity and size of devices and an accompanying increase in manufacturing cost.

A power signal is transmitted to each power receiver at an optimum frequency for high power transmission efficiency on the basis of the position and resonant frequency information of the power receiver; accordingly, power can be supplied to the power receivers without waste.

Figure 9:
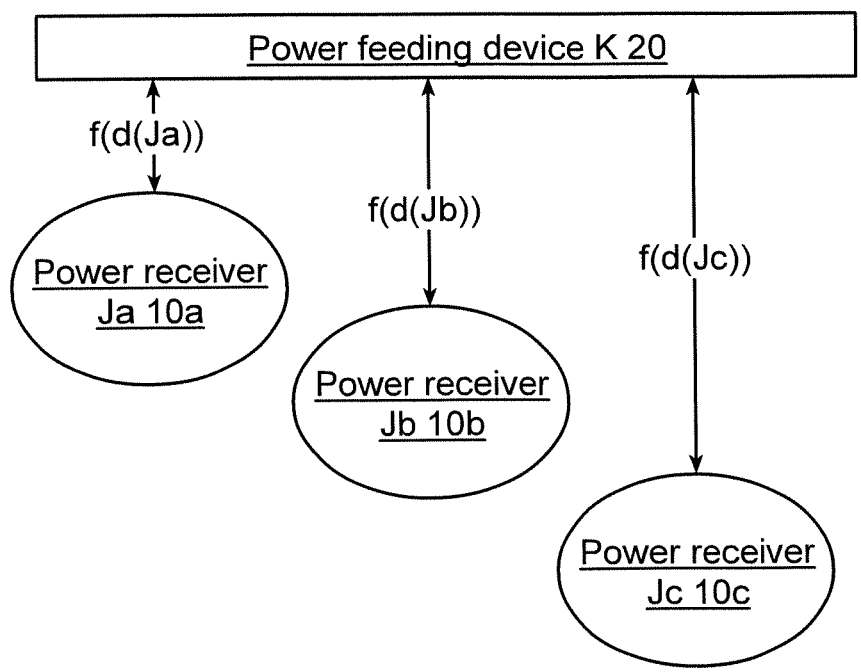
FIG. 9 illustrates an embodiment of a wireless power feeding system and a wireless power feeding method.

Although FIG. 9 illustrates a case where a single power feeding device is used, a plurality of power feeding devices may be used. Even with a plurality of power feeding devices, power feeding between the power feeding devices and the power receivers can be performed by finding out information on the distances and resonant frequencies and optimizing the frequencies of electrical signals to be transmitted, on the basis of the information, so as to obtain high transmission efficiency.

In the case where a plurality of power receivers exists within the range in which communication with the power feeding device can be carried out, power can be transmitted only to a specific power receiver using identification information of the power receiver as described in Embodiment 3.

Since identification information is found out and power feeding is performed, a power receiver which is an intended object can be precisely managed, and an efficient service for a winner for a prize or the like or a subscriber can be offered.

In addition, as described also in Embodiment 3, it is preferable to take measures for security, such as updating identification information including specific information like personal information for each power feeding, deleting unnecessary identification information from a power feeding device after finishing a recognition step for power feeding, or encrypting communication when transmitting identification information.

This embodiment can be implemented in an appropriate combination with the configurations described in the other embodiments.

This application is based on Japanese Patent Application serial no. 2010-171575 filed with Japan Patent Office on Jul. 30, 2010, the entire contents of which are hereby incorporated by reference.

What is claimed is:

1. A semiconductor device comprising:
an antenna circuit;
a rectifier circuit;
a demodulation circuit;
a signal processing circuit portion;
an oscillator circuit;
a divider circuit;
a switch;
a mixer; and
a secondary battery,
wherein the antenna circuit is configured to receive an electromagnetic wave from a power feeding device and output an electrical signal,
wherein the rectifier circuit is configured to rectify the electrical signal and generate a rectified signal,
wherein the demodulation circuit is configured to demodulate the rectified signal and transmit a demodulated signal to the signal processing circuit portion,
wherein the signal processing circuit portion is configured to receive the demodulated signal and generate a transmission signal,
wherein the oscillator circuit is configured to operate in response to the transmission signal and input a base carrier to the divider circuit and the mixer via the switch,
wherein the divider circuit is configured to divide a frequency of the base carrier, thereby generating signals having a plurality of frequencies which are lower than the frequency of the base carrier generated in the oscillator circuit,
wherein the switch is configured to select one of the signals having the plurality of frequencies and transmit a selected signal to the mixer,
wherein the mixer is configured to mix the base carrier with the selected signal, and is configured to transmit a mixed signal to the antenna circuit,
wherein the secondary battery is configured to store first power transmitted from the power feeding device and supply second power to a power load portion, and
wherein the switch is provided between the mixer and the divider circuit.

2. The semiconductor device according to claim 1, wherein the power feeding device comprises:
a transmission/reception circuit portion configured to transmit and receive an electromagnetic wave;
a signal processing circuit portion configured to process an electrical signal of the electromagnetic wave to be transmitted and received by the transmission/reception circuit portion of the power feeding device; and
a power supply portion configured to supply power to be transmitted to a power receiver,
wherein the signal processing circuit portion of the power feeding device has a position and resonant frequency detection function to detect a position and a resonant frequency of the power receiver, and a power transmission control function to control power to be transmitted to the power receiver.

3. A wireless power feeding system comprising:
a power feeding device; and
a power receiver including a power receiving device portion,
wherein the power feeding device comprises:
a transmission/reception circuit portion configured to transmit and receive an electromagnetic wave;
a signal processing circuit portion configured to process an electrical signal of the electromagnetic wave to be transmitted and received by the transmission/reception circuit portion of the power feeding device; and a power supply portion configured to supply power to be transmitted to the power receiver, wherein the signal processing circuit portion has a position and resonant frequency detection function to detect a position and a resonant frequency of the power receiver, and a power transmission control function to control power to be transmitted to the power receiver, wherein the power receiving device portion comprises:

a transmission/reception circuit portion configured to transmit and receive an electromagnetic wave;

a signal processing circuit portion configured to process an electrical signal of the electromagnetic wave to be transmitted and received by the transmission/reception circuit portion of the power receiving device portion; and a power storage portion including a secondary battery configured to store power transmitted from the power feeding device and supply power to be consumed by a power load portion, wherein the transmission/reception circuit portion of the power receiving device portion comprises an antenna circuit, a rectifier circuit, a mixer, a demodulation circuit, an oscillator circuit, a divider circuit, and a switch, wherein the switch is provided between the mixer and the divider circuit, and wherein the signal processing circuit portion of the power receiving device portion has a power reception control function to control power to be received from the power feeding device.

4. The wireless power feeding system according to claim 3, wherein the transmission/reception circuit portion of the power feeding device comprises an antenna circuit, a rectifier circuit, a modulation circuit, a demodulation circuit, an oscillator circuit, and a power supply circuit.

5. The wireless power feeding system according to claim 3, wherein the power receiver comprises a memory portion configured to store identification information to be read by the signal processing circuit portion of the power receiving device portion, and wherein the signal processing circuit portion of the power feeding device has an identification function to identify the identification information.

6. A wireless power feeding system comprising:

a power feeding device; and a power receiver including a power receiving device portion, wherein the power feeding device comprises:

a transmission/reception circuit portion configured to transmit and receive an electromagnetic wave;

a signal processing circuit portion configured to process an electrical signal of the electromagnetic wave to be transmitted and received by the transmission/reception circuit portion of the power feeding device; and a power supply portion configured to supply power to be transmitted to the power receiver, wherein the signal processing circuit portion of the power feeding device has a position and resonant frequency detection function to detect a position and a resonant frequency of the power receiver, and a power transmission control function to control power to be transmitted to the power receiver, wherein the power receiving device portion comprises:

a transmission/reception circuit portion configured to transmit and receive an electromagnetic wave;

a signal processing circuit portion configured to process an electrical signal of the electromagnetic wave to be transmitted and received by the transmission/reception circuit portion of the power receiving device portion, a power storage portion including a secondary battery configured to store power transmitted from the power feeding device and supply power to be consumed by a power load portion; and a detection portion configured to detect a voltage, a current, or a voltage and a current of the secondary battery, wherein the transmission/reception circuit portion of the power receiving device portion comprises an antenna circuit, a rectifier circuit, a mixer, a demodulation circuit, an oscillator circuit, a divider circuit, and a switch, wherein the switch is provided between the mixer and the divider circuit, and wherein the signal processing circuit portion of the power receiving device portion has a power reception control function to control power to be received from the power feeding device.

7. The wireless power feeding system according to claim 6, wherein the transmission/reception circuit portion of the power feeding device comprises an antenna circuit, a rectifier circuit, a modulation circuit, a demodulation circuit, an oscillator circuit, and a power supply circuit.

8. The wireless power feeding system according to claim 6, wherein the power receiver comprises a memory portion configured to store identification information to be read by the signal processing circuit portion of the power receiving device portion, and wherein the signal processing circuit portion of the power feeding device has an identification function to identify the identification information.

9. A wireless power feeding method comprising:

a first step of transmitting a position and resonant frequency detection signal using a plurality of sub-carriers having different frequencies from a power receiver to a power feeding device and detecting a position and a resonant frequency of the power receiver with the power feeding device;

a second step of adjusting a frequency of a power signal to be transmitted from the power feeding device on a basis of the position and the resonant frequency of the power receiver and transmitting power from the power feeding device to the power receiver; and a third step of storing the power transmitted from the power feeding device in a secondary battery of a power storage portion of the power receiver, wherein the plurality of sub-carriers having different frequencies is adjusted by a switch provided between a divider circuit and a mixer.

10. The wireless power feeding method according to claim 9, wherein the power receiver detects a voltage, a current, or a voltage and a current of the secondary battery and transmits a power feeding request signal or a power reception end signal to the power feeding device on a basis of the detection information.

11. The wireless power feeding method according to claim 9, further comprising a step of recognizing identification information of the power receiver with the power feeding device, before the first step.

* * * * *